United States Patent [19]

Hokamura

[11] Patent Number: 5,276,536
[45] Date of Patent: Jan. 4, 1994

[54] IMAGING APPARATUS HAVING A PRESSING/SEPARATING MECHANISM

[75] Inventor: Satoshi Hokamura, Saitama, Japan

[73] Assignee: Asahi Kogaku Kogyo Kabushiki Kaisha, Tokyo, Japan

[21] Appl. No.: 941,917

[22] Filed: Sep. 8, 1992

[30] Foreign Application Priority Data

Sep. 5, 1991 [JP] Japan ........................ 3-094910[U]

[51] Int. Cl.$^5$ .................... H04N 1/028; H04N 1/06; B65D 43/26; B65D 43/24
[52] U.S. Cl. ........................ 358/498; 358/496; 358/478; 220/264; 220/335
[58] Field of Search ............ 358/478, 494, 496, 498; 355/230, 231, 76, 75; 220/264, 335

[56] References Cited

U.S. PATENT DOCUMENTS

| | | |
|---|---|---|
| 4,097,145 | 6/1978 | Luperti et al. .................. 220/264 |
| 4,895,288 | 1/1990 | Kotani et al. .................. 358/498 |
| 5,113,228 | 5/1992 | Monma et al. . |
| 5,155,539 | 10/1992 | Yamaguchi et al. . |

*Primary Examiner*—Edward L. Coles, Sr.
*Assistant Examiner*—Scott A. Rogers
*Attorney, Agent, or Firm*—Sandler Greenblum & Bernstein

[57] ABSTRACT

An imaging apparatus is provided with a main body; a cover member which is swingably connected to the main body between a closed position for closing the main body and an open position for opening the main body; and an image read unit and a platen member defining a feeding path of a sheet therebetween. A pressing/separating mechanism pressedly contacts the image read unit and platen member with respect to each other when the cover member is in the closed position and separates the image read unit and platen member from each other when the cover member is in the open position.

18 Claims, 6 Drawing Sheets

IMAGING APPARATUS HAVING A
PRESSING/SEPARATING MECHANISM

BACKGROUND OF THE INVENTION

The present invention relates to an imaging apparatus for forming a visible image (e.g., toner image) on a sheet, more specifically, to an imaging apparatus in which an image read unit and a platen member provided which are pressedly contact each other and between which a feed path of the sheet is defined.

A document reading unit for reading information recorded to a document in a facsimile and the like is arranged such that a line-shaped image sensor is disposed perpendicular to the direction in which the document is fed in the vicinity of the feed path of the document. The recorded information is read by the image sensor while the document is being fed.

It has recently been contemplated to dispose an image sensor having the same length as the width of a document in close contact with the document being fed. With this arrangement, the size of a device can be reduced because a reduction optical system is not necessary. In this close contact type image sensor, since the degree of close contact of the document with the image sensor influences reading accuracy, a press member is disposed in confrontation with the image sensor to press the document against the image sensor and cause the same to come into in pressed contact therewith.

A reading unit making use of the aforesaid close contact type image sensor has a problem such that when a paper (document) is jammed between the image sensor and the press member, the document is dragged between the image sensor and it is the press member and difficult to be released from this state.

SUMMARY OF THE INVENTION

It is therefore an object of the present invention to provide an imaging apparatus with an improved structure for releasing a sheet or document when jammed.

An other object of the present invention is to provide imaging apparatus for enabling an easy release of a jammed sheet between an image read unit and a platen member.

For the above purpose, according to the present invention, an imaging apparatus is provided which comprises a main body; a cover member which is swingably connected to the main body between a closed position for closing the main body and an open position for opening the main body; an image read unit and a platen member between which a feeding path of a sheet is defined; and pressing/separating means for pressedly contacting the image read unit and platen member with each other when the cover member is in the closed position and for separating the image read unit and platen member from each other when the cover member is in the open position.

According to the above arrangement, since the image read unit and the platen member which form the feeding path of the sheet there between, are separated from each other, when the sheet is jammed between the image read unit and the platen member, the problem of the jammed sheet can be easily solved by separating the image read unit and the platen member.

DESCRIPTION OF THE EMBODIMENTS

One embodiment of the present invention will be described below with reference to the drawings.

Figure 1:
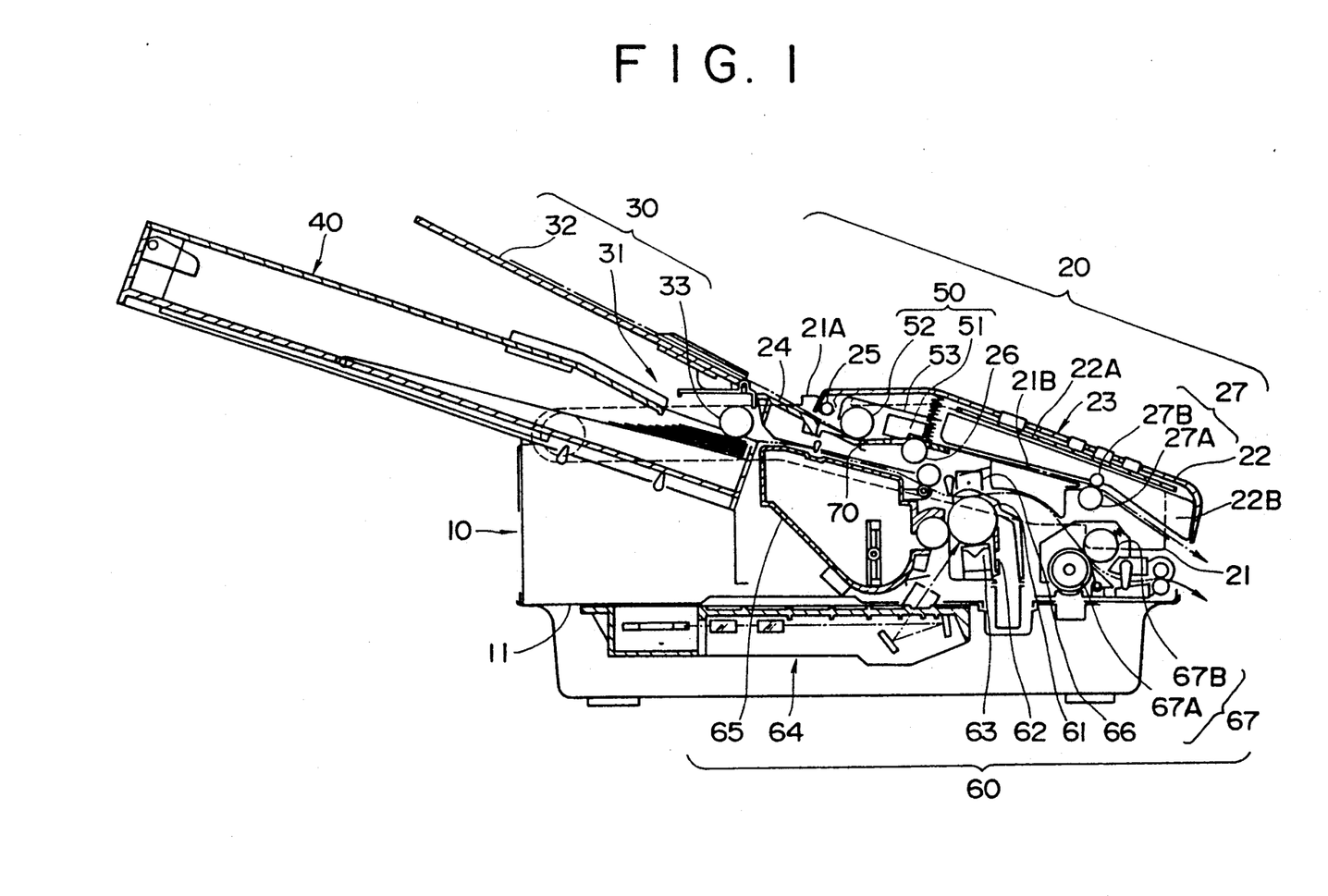
FIG. 1 is a side view showing the schematic arrangement of an electrophotographic facsimile device to which one embodiment of an imaging apparatus according to the present invention is applied.

FIG. 1 is a side view showing the schematic arrangement of an electrophotographic facsimile device according to one embodiment of an imaging apparatus of the present invention, wherein the right side in the figure is the front side of the facsimile device.

The facsimile device shown in FIG. 1 has a main plate 11 and a paper feed unit 30 disposed above the main plate 11, for supplying or introducing a recording paper for receiving information and a document to be transmitted into the device. The paper feed unit 30 is mounted to the upper rear end of a main body 10. The upper portion of the device located in front of the paper feed unit 30 includes an upper arrangement member 20 supported through an arm 21A at an end of the main body 10 on the paper feed unit 30 side (rear side) thereof.

The paper feed unit 30 includes of a cassette mounting unit 31 having a recording paper cassette 40 detachably mounted to the recording paper introduction position of the paper feed unit 30, and a document holder 32 for documents to be transmitted, which is located at the front end (right side in FIG. 2) of the cassette mounting unit 31. The cassette 40 accommodates recording papers as cut sheets onto which received information is to be recorded.

The cassette mounting unit 31 has a recording paper introduction roller 33 disposed at the position corresponding to the upper extreme end of the recording papers accommodated in the recording paper cassette 40 mounted to the cassette mounting unit 31.

A recording unit 60, as an imaging unit including various operation mechanisms for an electrophotographic method, is provided on the main body 10.

The recording unit 60 includes a cleaning mechanism 62 for cleaning toner remaining on the surface of a photoconductive drum 61 by abutting a blade formed of an elastic member against the surface thereof; a corona charger 63 for uniformly charging the photoconductive material on the surface of the photoconductive drum 61; a scanning optical system unit 64 for exposing and scanning the surface of the photoconductive drum 61 with a laser beam turned ON and OFF in response to image data; a development unit 65 for depositing toner to a portion of the photoconductive material from which electric charges are removed by exposure and made into a latent image, and making the latent image into a toner image; and a transfer charger 66 for charging a recording paper and transferring the toner image thereon.

In the above arrangement, each unit is disposed about the photoconductive drum 61 driven in rotation at a predetermined circumferential speed by a not shown drive motor. Further, a fixing unit 67 is disposed at a location to which the recording paper to which the toner image is transferred by the transfer charger 66 is fed. The fixing unit 67 includes of a heat roller 67A heated to a predetermined temperature and a press roller 67B disposed obliquely upward of the heat roller 67A on the front end side of the facsimile device and pressed against the heat roller 67A. The recording papers accommodated in the recording paper cassette 40 are sequentially introduced into a recording paper path from the uppermost recording paper thereof by the rotation of the recording paper introduction roller 33 of the cassette mounting unit 31.

Further, the surface of the photoconductive drum 61 is main scanned (exposed) in the rotational axis direction thereof by a laser beam supplied from the scanning optical system unit 64 and modulated in response to received print or image data, while the photoconductive drum 61 is rotated (sub-scanned). As a result, the electrostatic latent image is formed on the surface of the photoconductive drum 61. This latent image is developed into the toner image by the development unit 65; the toner image is transferred to the recording paper which is fed along a path shown in FIG. 1 by a two-dot-and-dash line and charged by the transfer charger 66; further, the toner image is fixed to the recording paper by the fixing unit 67; and then the recording paper is discharged through the front end of the facsimile device.

More specifically, in this arrangement, the toner image is transferred onto the lower surface of the recording paper (an image is formed) and the recording paper is discharged, with the surface thereof on which the image being formed is faced downward in a so-called face down discharge mode.

Figure 2:
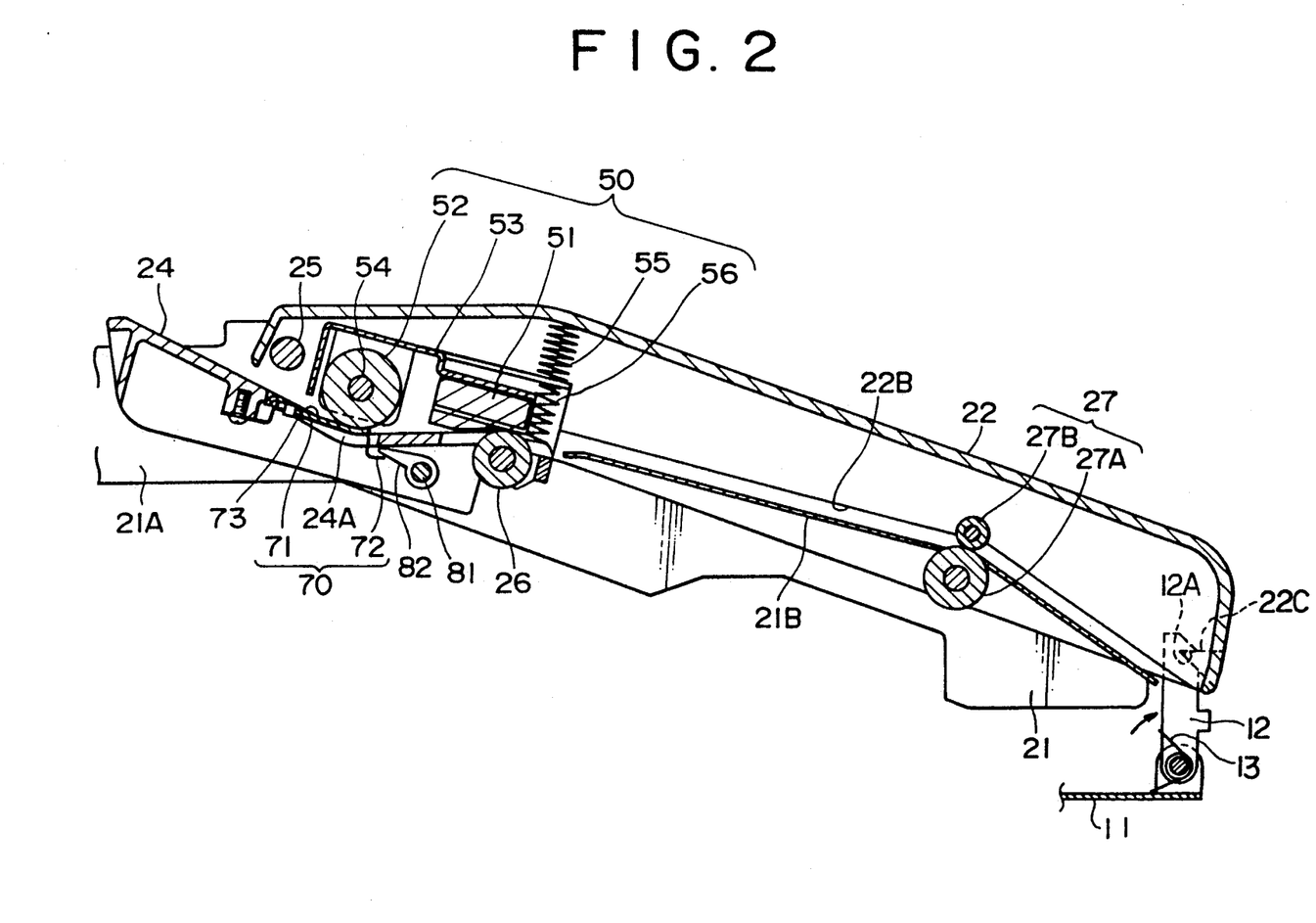
FIG. 2 is an enlarged cross sectional view of the upper arrangement member of the electrophotographic facsimile device.

As shown in the enlarged cross sectional view of FIG. 2, the upper arrangement member 20 has an operation panel 22 as a cover member, which is swingably supported on the upper side of a panel frame 21 by a swing shaft 25, which is relatively unrotatably fixed to the end of the panel frame 21 on the paper feed unit 30 side thereof. The panel frame 21 is swingably mounted to the upper rear end of the main body 10 through the arm 21A extending to the rear end side of the device.

The operation panel 22 is locked by a lock member 12 as a lock means in a closed position. The lock member 12 is pivotally mounted on the main plate 11 and pivoted in the clockwise direction in the drawing by a torsion spring 13. More specifically, the lock state is established by engaging an engage pawl 22C which is formed on the inner surface of the operation panel 22 with an engaging groove 12A which is formed on the front surface of the lock member 12. The lock state is released by disengaging the engage pawl 22C from the engaging groove 12A when the lock member 12 is pushed against the urging force of the torsion spring 13. When the lock state is released, the operation panel 22 is popped up a small amount by the urging force of an upper spring 55, as described below, and then is swung from the popped up position to an open position shown in FIG. 6 by an operator.

An operation panel base plate 22A (not shown in FIG. 2) is disposed inside (on the lower side of) the operation panel 22 along the inner surface thereof and a document upper guide plate 22B is disposed inside (on the main body 10 side of) the operation panel base plate 22A. A reading head 50 including of a document introduction roller 52 and reading sensor 51, each being supported by a head frame 53, is disposed in the vicinity of the document introduction side (paper feed unit 30 side) of the document upper guide plate 22B.

An introduction unit lower guide 24 is disposed below the reading head 50 and a document lower guide plate 21B is disposed below the document upper guide plate 22B.

The rear end side (the side adjacent to the paper feed unit 30) of the introduction unit lower guide 24 is formed as an inclined surface which is continuous with the document holder 32 of the paper feed unit 30. A feed roller 26 is disposed at the position of the introduction unit lower guide 24 corresponding to the reading sensor 51 of the reading head 50, and a press and support plate 70 is disposed at the position of the lower guide 24 corresponding to the document introduction roller 52.

A pair of paper discharge rollers 27 are disposed substantially at the center of the document lower guide plate 21B in the forward and rearward directions thereof. The pair of the paper discharge rollers 27 include a lower roller 27A projected slightly above the upper surface of the document lower guide plate 21B and an upper roller 27B abutted against the projected upper surface of the lower roller 27A.

With the above arrangement of the operation panel 22 and panel frame 21, a document path is formed between the document guide members on the operation panel 22 side (the reading sensor 51 and document upper guide plate 22B) and the document guide members on the panel frame 21 side (the introduction unit lower guide 24, press and support plate 70 and document lower guide plate 21B). The document introduction roller 52 of the reading head 50, the feed roller 26 of the panel frame 21 and the lower roller 27B of the pair of paper discharge rollers 27 are rotated by a not shown drive motor at a predetermined circumferential speed.

With the above arrangement, a document placed on the document holder 32 is fed through the document path along a feed path shown by a dot-dash line in FIG. 1 and the information recorded on the document is read by the reading head 50. More specifically, the document placed on the document holder 32 is introduced into the upper arrangement member 20 by the document introduction roller 52; the information recorded on the upper surface of the document is read by the reading sensor 51 while the document is being fed by the feed roller 26; and the document is discharged from the front end of the device by being fed by the pair of paper discharge rollers 27.

The document introduction roller 52 is mounted through a one way clutch (not shown), so that it can be rotated in an idle state in a document feed direction and rotated at a circumferential speed substantially one-half the speed of the feed roller 26 and the lower roller 27B of the pair of paper discharge rollers 27. With this arrangement, the document placed on the document holder 32 is fed slowly by the document introduction roller 52 and introduced into the upper arrangement member 20 until the extreme end of the document reaches the feed roller 26.

After the extreme end of the document has reached the feed roller 26, the document is fed rapidly at a predetermined speed by the feed roller 26. At this time, the document introduction roller 52 is rotated in the idle state by the action of the one way clutch. A predetermined gap is established between the rear end of a document to be read and a document to be subsequently introduced by the difference between the circumferential speeds of the document introduction roller 52 and the feed roller 26. As a result, an interval can be detected between the documents.

The document path is opened by swinging the operation panel 22 with respect to the panel frame 21 about the swing shaft 25 as the support point of the operation panel 22. With this arrangement, trouble such as jamming of a document being fed can be solved and the maintenance of the device can be performed easily. Note that the operation panel 22 is locked by the lock member 13 at the front end of the device.

Figure 3:
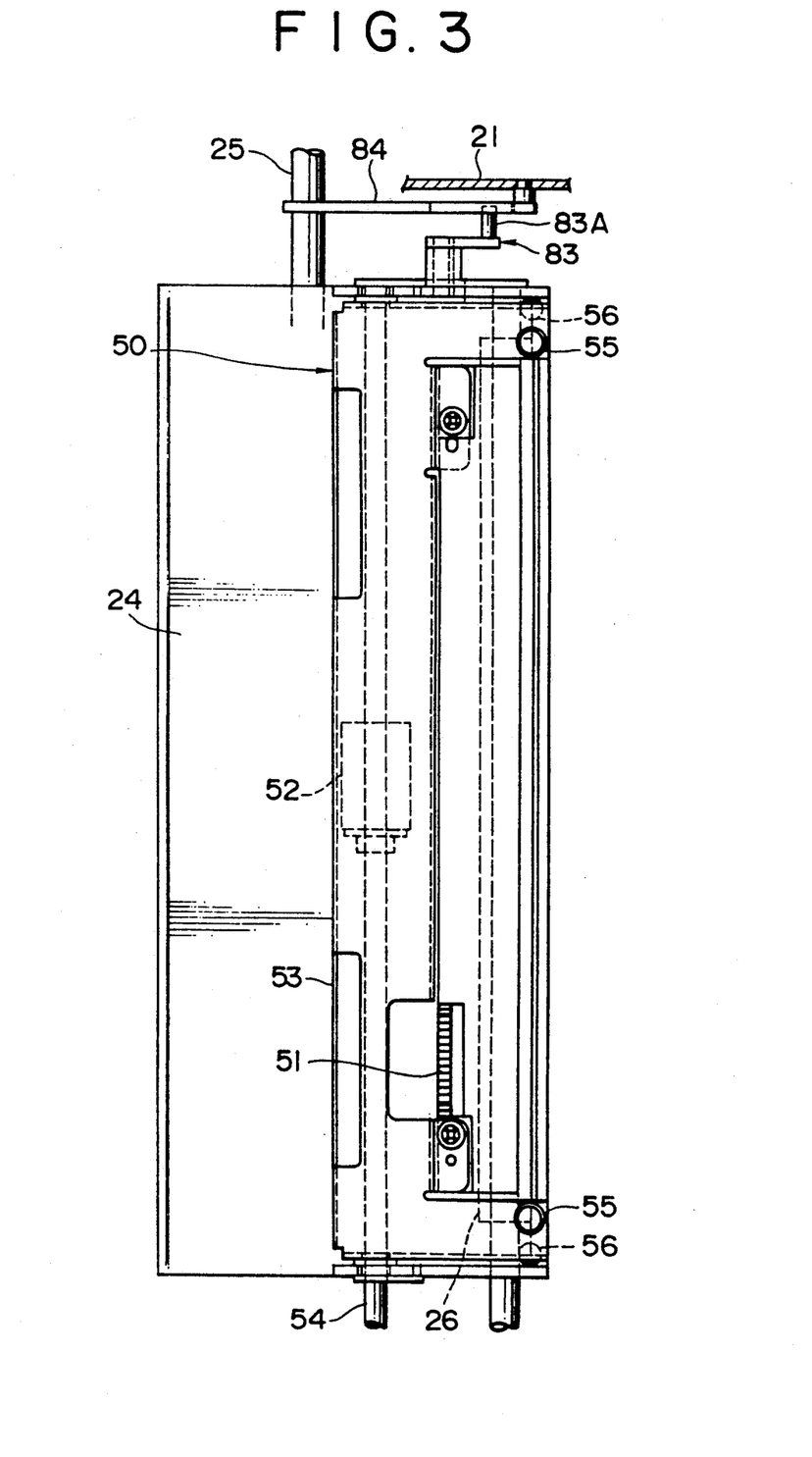
FIG. 3 is a diagram of the reading head of the electrophotographic facsimile device viewed from the upper side thereof.

As shown in FIG. 3 showing the reading head 50 viewed from the upper side thereof, the reading head 50 is arranged such that the head frame 53 supporting the close contact type reading sensor 51 having a length corresponding to the width of a document which can be transmitted by the facsimile device is swingably supported by the panel frame 21 through a rotation shaft 54 on the paper feed unit 30 side with respect to the reading sensor 51.

Figure 4:
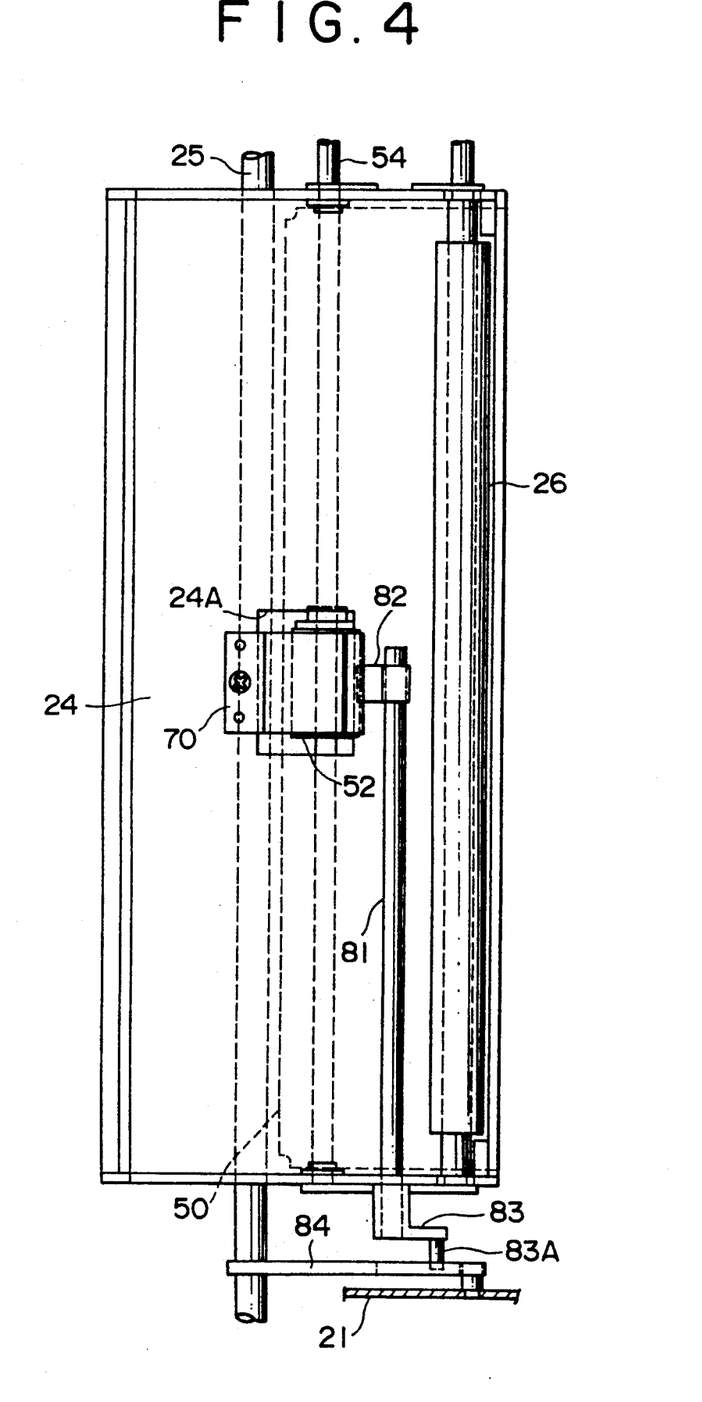
FIG. 4 is a diagram of an introduction unit lower guide viewed from the lower surface (back surface) thereof.

As shown in FIG. 4, showing the introduction unit lower guide 24 viewed from the lower surface (back surface) thereof, the document introduction roller 52 having a predetermined length is located at substantially the center in the lengthwise direction of the introduction unit lower guide 24. The document introduction roller 52 can be rotated in the idle state in the document feed direction through the not shown one way clutch following the movement of the document, as described above.

The rotation shaft 54 is coupled with a not shown drive source at an end thereof so that the document introduction roller 52 is rotated by the drive source at a circumferential speed substantially one-half the speed of the feed roller 26 and the lower roller 27B of the pair of paper discharge roller 27.

Further, an upper spring 55 is interposed between the front end upper surface of the head frame 53 and the inner surface of the operation panel 22, and a lower spring 56 is interposed between the front end lower surface of the head frame 53 and the upper surface of the introduction unit lower guide 24. The relationship between the elastic return forces of the upper spring 55 and lower spring 56 is such that the upper spring 55 has a stronger elastic return force than the lower spring 56. Therefore, when the operation panel 22 is closed as shown in FIG. 2, the reading head 50 is swung and urged in a clockwise direction (i.e., on the introduction unit lower guide 24 side) in FIG. 2 by the difference of the urging forces of the upper spring 55 and lower spring 56.

An opening 24A is defined at the position of the introduction unit lower guide 24 corresponding to the document introduction roller 52. The press and support plate 70 formed of a spring member is located at the edge of the opening 24A on the paper feed unit 30 side and fixed to the opening 24A at the end thereof.

The press and support plate 70 has a convex portion 71 which is bent at the center in the longitudinal direction thereof and can be inserted into the opening 24A. The front end of the press and support plate 70 is bent to a crank-shape and formed as an operation hook 72. The rear end of the press and support plate 70 is fixed to the edge of the opening 24A on the back surface (lower surface) side of the introduction unit lower guide 24 located on the paper feed unit 30. Thus, the convex portion 71 is located in the opening 24A and the operation hook 72 is spaced apart from the back surface of the introduction unit lower guide 24 by a predetermined distance.

A friction plate 73 formed of a thin rubber plate is attached to the upper surface (on the document introduction roller 52 side) of the convex portion 71 of the press and support plate 70 at the end of the paper feed unit 30 side of the convex portion 71.

The extreme end of the operation arm 82 is located above the operation hook 72.

The operation arm 82 is rotatably supported by a side wall of the introduction unit lower guide 24 and fixed to the extreme end of an operation shaft 81 disposed in the direction perpendicular to the feed direction of the document.

A lever 83 having an operating projection 83A, projecting from the extreme end thereof, is fixed to the other end of the operation shaft 81 projecting, which projects from the side wall of the introduction unit lower guide 24 to the outside. The operating projection 83A of the lever 83 slidingly movably engages with the cam hole 84A of a cam arm 84.

Figure 5:
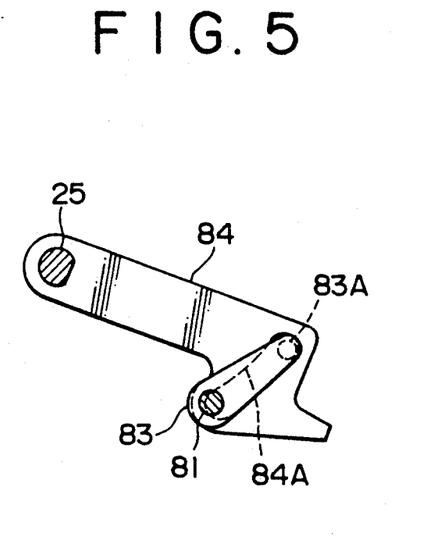
FIG. 5 is a diagram showing a lever mounted to an end of an operation shaft.

As shown in FIG. 5, the cam arm 84 is fixed to one end of the swing shaft 25 of the operation panel 22. The cam hole 84A of the cam arm 84 is formed such that when the cam arm 84 is swung counterclockwise in FIG. 5 about the swing shaft 25, the engaged portion of the operating projection 83A of the lever 83 is located at the side approaching the center of a swing motion (the swing shaft 25). Therefore, the lever 83 is swung counterclockwise by the counterclockwise swing motion of the cam arm 84 in FIG. 5.

With the above arrangement, when the operation panel 22 is closed, the reading head 50 is pressed clockwise in FIG. 2 through the upper spring 55. Further, the reading sensor 51 is caused to come into pressed contact with the feed roller 26 by a predetermined press force by the elastic return force of the upper spring 55. At this time, the extreme end of the operation arm 82 is spaced apart from the operation hook 72 of the press and support plate 70 and the friction plate 73 is caused to come into pressed contact with the document introduction roller 52 by a predetermined press force by the press and support plate 70 in this state. More specifically, according to this embodiment, the upper spring 55 and feed roller 26 constitutes a press means for causing the document to come into pressed contact with the reading sensor 51 (reading head 50) and the document is caused to come into pressed contact with the reading sensor 51 (reading head 50) by the feed roller 26 as a press member. Further, the press and support plate 70 serves as a press member for causing the document to come into pressed contact with the document introduction roller 52 (reading head 50).

In a reading operation, the uppermost document placed on the document holder 32 is fed by rotating the document introduction roller 52 and introduced into the upper arrangement member 20. Then, the document is fed while being caused to come into pressed contact with the reading sensor 51 by a predetermined press force by the feed roller 26 and the information recorded on the upper surface of the document is read by the reading sensor 51. At this time, the friction plate 73 prevents documents accumulated under the uppermost document from being introduced together with the uppermost document by the frictional resistance thereof.

Figure 6:
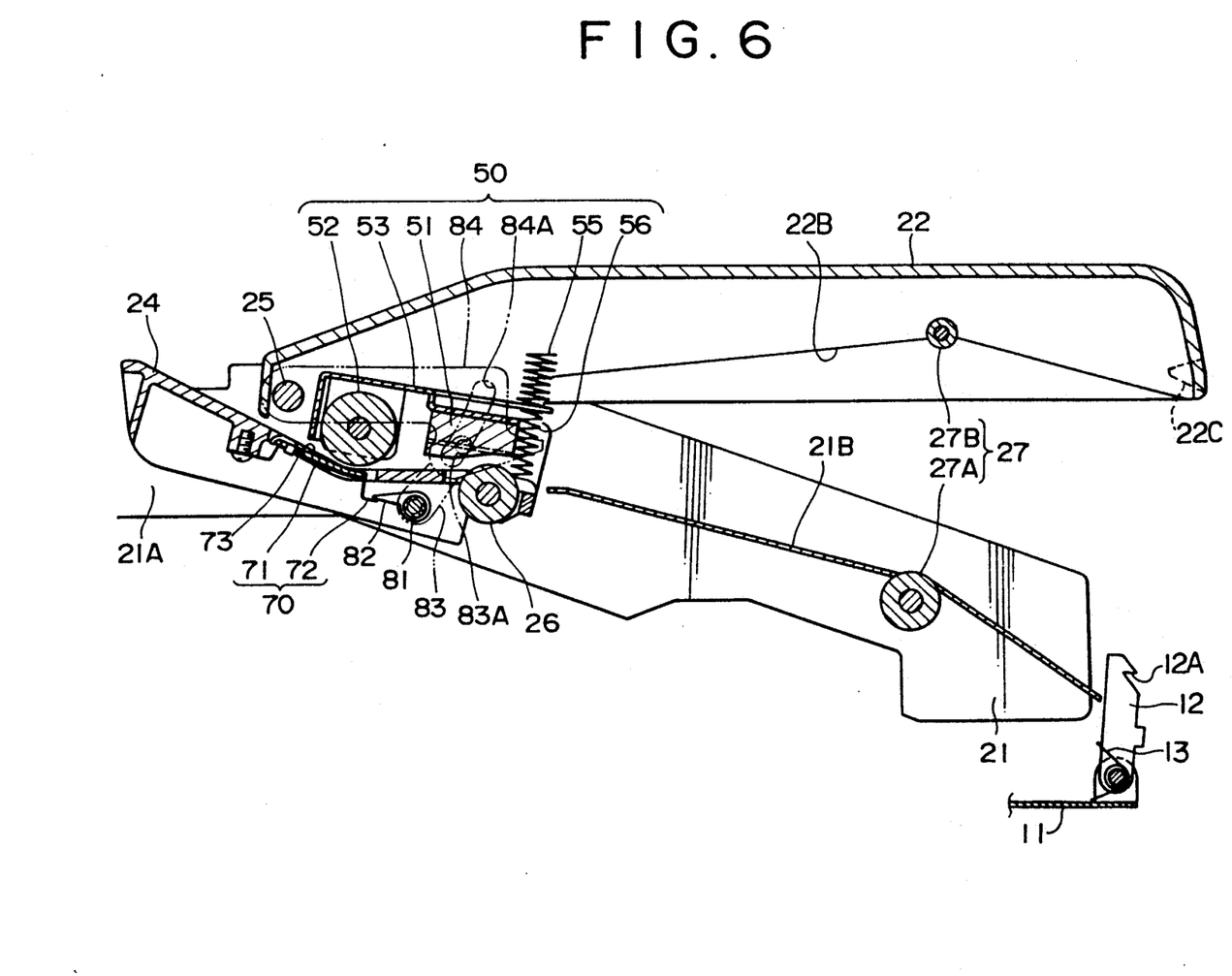
FIG. 6 is a diagram showing the state of an operation panel swung and opened from the state shown in FIG. 2.

On the other hand, when the operation panel 22 is opened upward from the above state, the reading head 50, pressed which is downward by the upper spring 55, is released from this pressed state and thus swung counterclockwise in FIG. 2 by the elastic return force of the lower spring 56. As a result, the reading sensor 51 is spaced apart from the feed roller 26 by a predetermined distance. At the same time, the lever 83 is swung counterclockwise by the counterclockwise swing motion of the cam arm 84 in FIG. 2, and thus the operation arm 82 presses the operation hook 72 of the press and support plate 70 downward. As a result, as shown in FIG. 6, the press and support plate 70 is bent clockwise to cause the friction plate 73 on the upper surface thereof to be spaced apart from the document introduction roller 52 by a predetermined distance. More specifically, when the operation panel 22 is swung and opened about the swing shaft 25 to open the document path, the friction plate 73, which is pressed against the document introduction roller 52, is released therefrom and spaced apart from the document introduction roller 52. In the same way, the reading sensor 51, which is pressed against the feed roller 26, is released therefrom and the reading sensor is spaced apart from the feed roller. With this arrangement, the problem of a document jammed between the document introduction roller 52 and the friction plate 73 and between the reading sensor 51 and the feed roller 26 can be solved.

In summary, according to the present embodiment, the arrangement wherein the reading head 50 is pressed by the operation panel 22 through the upper spring 55, as well as the lower spring 56 being interposed between the reading head 50 and the introduction unit lower guide 24, constitutes the pressed contact release means for releasing the feed roller 26, which is caused to come into pressed contact with the reading head. This release operation is carried out in association with the operation for swinging and opening the cover member (operation panel 22). Further, the operation shaft 81, operation arm 82, lever 83 and arm 84 constitute the pressed contact release means for releasing the friction plate 73 (press and support plate 70), which is caused to come into contact with the document introduction roller 52.

As described above, according to the above arrangement, since the reading head 50, which is caused to come into pressedly contact with the document (the feed roller 26), is released in association with the operation for swinging and opening the operation panel 22, which is carried out by the pressed contact release means, when the document is jammed between the reading sensor 51 and the feed roller 26 as the press member, the problem of a jammed document can be easily solved by swinging and opening the operation panel 22.

The present disclosure relates to subject matters contained in Japanese Utility Model Application No. HEI 3-94910 filed on Sep. 5, 1991, which is expressly incorporated herein by reference in its entirety.

What is claimed is:

1. An imaging apparatus comprising:
   a main body;
   a cover member which is swingably connected to the main body for movement between a closed position for closing the main body and an open position for opening the main body;
   an image read unit mounted for movement relative to said main body and said cover member, and a platen member attached to said main body, said image read unit and said platen member defining a feeding path of a sheet therebetween; and
   pressing/separating means for pressedly contacting said image read unit and platen member with each other when said cover member is in said closed position, and for separating said image read unit and platen member from each other when said cover member is moved to said open position.

2. The imaging apparatus according to claim 1, wherein
   said pressing/separating means includes:
   first urging means for urging said image read unit so as to pressedly contact the platen member; and
   second urging means for urging the image read unit and platen member so as to be separated from each other when said cover member is in said open position, said image read unit and platen member pressedly contacting each other against the urging force of said second urging means when said member is in said closed position.

3. An imaging apparatus comprising:
   a main body;
   a cover member which is swingably connected to the main body for movement between a closed position for closing the main body and an open position for opening the main body;
   a first member mounted for movement relative to said main body and said cover member, and a second member attached to said main body, said first and second members defining a feeding path of a sheet therebetween;
   first urging means for urging said first member so as to pressedly contact the second member; and
   second urging means for urging the first member away from said second member so as to be separated from each other when said cover member is moved to said open position, said first and second members being in pressed contact with each other against the urging force of said second urging means when said cover member is in said closed position.

4. The imaging apparatus according to claim 3, wherein
   said first member includes an image read unit, and
   said second member includes a platen member.

5. The imaging apparatus according to claim 2, wherein
   said first urging means is provided between said cover member and said image read unit, and
   said second urging means is provided between said image read unit and platen member.

6. The imaging apparatus according to claim 5, wherein
   said first urging means comprises a first spring, and
   said second urging means comprises a second spring.

7. The imaging apparatus according to claim 6, wherein
   one end of said first spring is coupled to said image read unit and the other end of said first spring is capable of engaging the cover member upon the swinging motion of said cover member from the open position to the closed position.

8. The imaging apparatus according to claim 5, wherein
said urging force of the first urging means is set to be larger than that of the second urging means.

9. The imaging apparatus according to claim 5, further comprising:
lock means for releasably locking the cover member in said closed position.

10. The imaging apparatus according to claim 9, wherein
said cover member is swingable to the open position upon the urging force of said first urging means and the image read unit and platen member are separated from each other by the urging force of said second urging means when said lock means is released.

11. The imaging apparatus according to claim 10, wherein
said lock means is provided on said main body.

12. The imaging apparatus according to claim 5, further comprising:
third and fourth members which are provided on the upstream side in the feeding direction of said sheet with respect to said image read unit and said platen member, and said feeding path of the sheet being also defined between said image read unit and said platen member.

13. The imaging apparatus according to claim 12, wherein
said third member includes a feed roller for feeding the sheet to a nip portion of said image read unit and platen member upon rotation thereof, and
said fourth member including an elastic plate in pressed contact with said feed roller when said cover member is in said closed position.

14. The imaging apparatus according to claim 13, further comprising:
releasing means for releasing the elastic plate from the feed roller upon swinging motion of said cover member from the closed position to the open position.

15. The imaging apparatus according to claim 14, wherein
said elastic plate is fixed to said main body at one end thereof, and
the other end of said elastic plate is set to be free.

16. The imaging apparatus according to claim 15, wherein
said releasing means includes:
a cam arm integrally swingable with said cover member and having a cam groove which extends in an inclined direction to the circumference of a circle having a central point as a swinging center of the cam arm;
a lever, one end of which is pivotally connected to the main body;
a projection which is inserted in said cam groove and is formed at the other end of the lever, said lever being rotated upon the swinging motion of said cam arm corresponding to the cover member; and
an operation arm which is fixed to said one end of said lever, the distal end of said operation arm engaging said other end of the elastic plate, thereby being separated from the feed roller upon the swinging motion of the cover member from the closed position to the open position.

17. The imaging apparatus according to claim 16, wherein
said distal end of the operation arm is separated from the other end of said elastic plate when said cover member is in the closed position.

18. The imaging apparatus according to claim 13, wherein
said elastic plate is formed by a leaf spring.

* * * * *